United States Patent
Yoshikawa (10) Patent No.: US 9,411,455 B2
(45) Date of Patent: Aug. 9, 2016

(54) DISPLAY DEVICE WITH TOUCH PANEL

(71) Applicant: Sharp Kabushiki Kaisha, Osaka-shi, Osaka (JP)

(72) Inventor: Takahiro Yoshikawa, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 14/406,273

(22) PCT Filed: Apr. 25, 2013

(86) PCT No.: PCT/JP2013/062269
§ 371 (c)(1),
(2) Date: Dec. 8, 2014

(87) PCT Pub. No.: WO2013/190909
PCT Pub. Date: Dec. 27, 2013

(65) Prior Publication Data
US 2015/0324043 A1 Nov. 12, 2015

(30) Foreign Application Priority Data
Jun. 20, 2012 (JP) ................................ 2012-139106

(51) Int. Cl.
*G06F 3/041* (2006.01)
*G02F 1/1333* (2006.01)
*G06F 1/16* (2006.01)

(52) U.S. Cl.
CPC .......... *G06F 3/0412* (2013.01); *G02F 1/13338* (2013.01); *G02F 1/133308* (2013.01); *G06F 1/1637* (2013.01)

(58) Field of Classification Search
CPC .......... G02F 1/13338; G02F 1/133308; G02F 1/133608; G06F 1/1637; G06F 3/0412
See application file for complete search history.

(56) References Cited

U.S. PATENT DOCUMENTS

| | | | | |
|---|---|---|---|---|
| 7,209,195 | B2* | 4/2007 | Lin .................... | G02F 1/133308 349/58 |
| 2007/0040816 | A1* | 2/2007 | Toyomaki ........... | G02F 1/13338 345/174 |
| 2008/0007538 | A1* | 1/2008 | Kotera .................. | G06F 3/0412 345/173 |
| 2011/0157087 | A1* | 6/2011 | Kanehira .............. | G06F 3/0414 345/174 |
| 2011/0187634 | A1* | 8/2011 | Kim ........................ | G09G 3/36 345/102 |
| 2011/0227848 | A1* | 9/2011 | Furusawa .............. | G06F 1/1626 345/173 |

(Continued)

FOREIGN PATENT DOCUMENTS

| | | |
|---|---|---|
| JP | 2003-233059 A | 8/2003 |
| JP | 2007-052183 A | 3/2007 |

(Continued)

OTHER PUBLICATIONS

Official Communication issued in International Patent Application No. PCT/JP2013/062269, mailed on Jul. 9, 2013.

*Primary Examiner* — Sanjiv D Patel
(74) *Attorney, Agent, or Firm* — Keating & Bennett, LLP (57) ABSTRACT

In order to provide a display device which includes a touch panel and enable to (i) maintain flatness of a display surface, (ii) increase productivity, and (iii) reduce variations caused during the manufacturing process, provided is a display device (1) including: a display panel (2); a touch panel (4) provided on an observer side of the display panel (2); and a single holding frame (6) surrounding a side surface of each of the display panel (2) and the touch panel (4), each of the display panel (2) and the touch panel (6) being held by the single holding frame.

5 Claims, 6 Drawing Sheets

(56) References Cited

U.S. PATENT DOCUMENTS

2012/0236207 A1* 9/2012 Fukuda ............... G02B 6/0088 348/725
2014/0362328 A1* 12/2014 Kuroki ............. G02F 1/133308 349/58

FOREIGN PATENT DOCUMENTS

| | | |
|---|---|---|
| JP | 2010-244514 A | 10/2010 |
| JP | 2011-191608 A | 9/2011 |

* cited by examiner

DISPLAY DEVICE WITH TOUCH PANEL

TECHNICAL FIELD

The present invention relates to a display device including a touch panel and a display panel.

BACKGROUND ART

In recent years, there is wide use of a display device which includes a touch panel and can detect a position of contact when a finger or an input pen (object to be detected) is brought into contact with the display surface. The display device including the touch panel is arranged such that the touch panel is provided on a front surface side (observer side) of a display panel.

Figure 8:
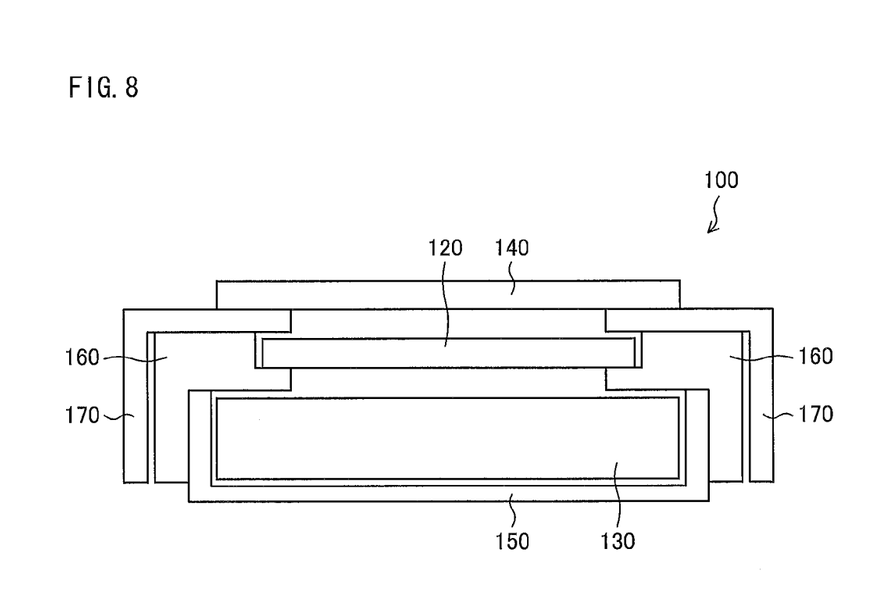
FIG. 8 is a cross-sectional view of a conventional display device including a touch panel.

FIG. 8 is a cross-sectional view illustrating a conventional display device including a touch panel. A display device 100 illustrated in FIG. 8 includes a display panel 120, a backlight 130 provided on a back surface side of the display panel 120, a touch panel 140 provided on a front surface side of the display panel 120, a chassis 150 which contains the backlight 130, a holding frame 160 which holds the display panel 120, and a bezel 170 which covers the holding frame 160 and an outer circumferential section of the display panel 120. The touch panel 140 is attached and fixed to the bezel 170 via an adhesive so as to overlap an end section of the bezel 170.

The display device 100 illustrated in FIG. 8 has a problem that it is difficult to obtain flatness of a display surface because a step is formed between the touch panel 140 and the bezel 170.

Figure 9:
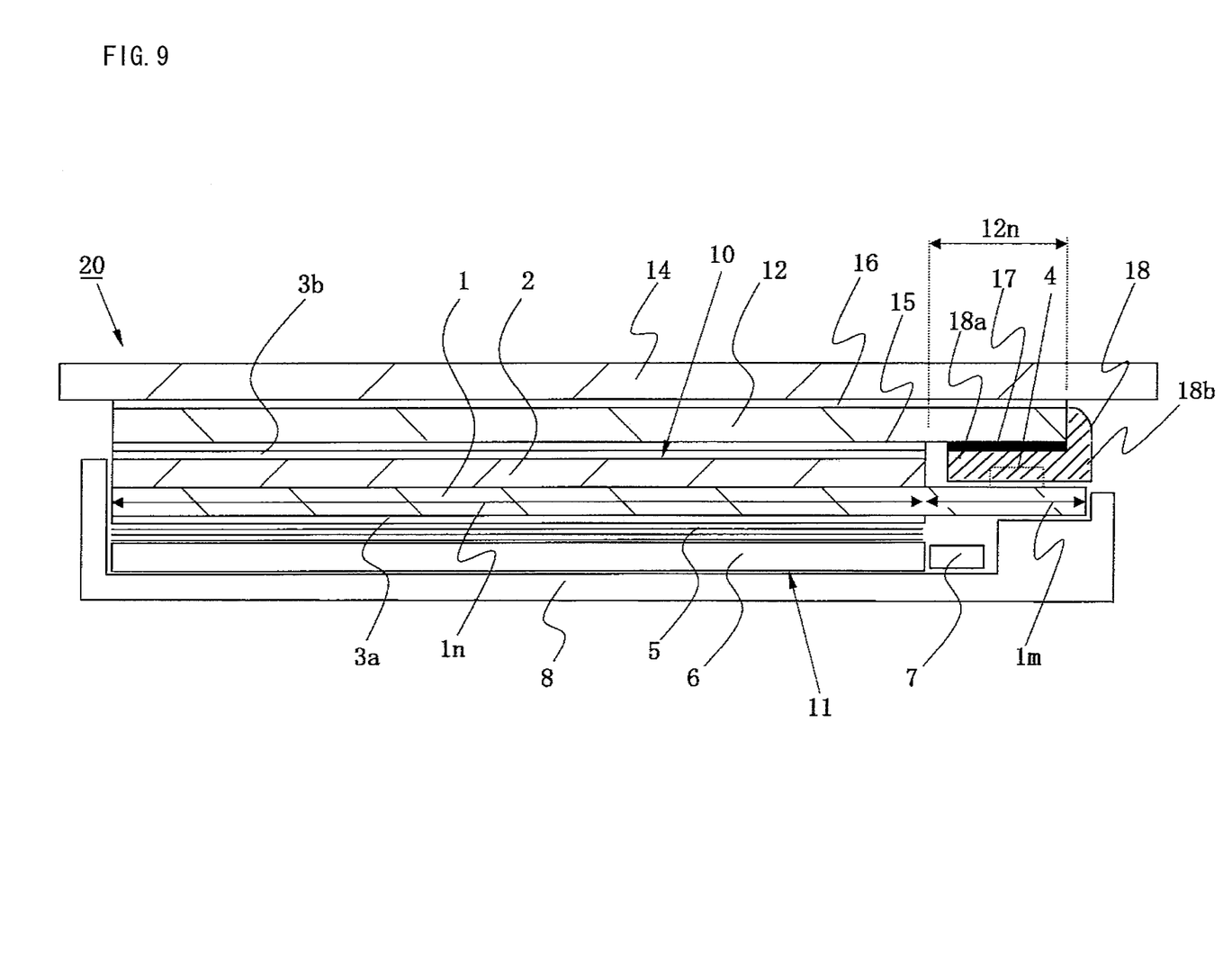
FIG. 9 is a cross-sectional view of a display device including a touch panel described in Patent Literature 1.

FIG. 9 is a cross-sectional view illustrating a display device including a touch panel described in Patent Literature 1. A display device 20 illustrated in FIG. 9 includes a display panel 10, a backlight 11 provided on a back surface side of the display panel 10, a touch panel 12 provided on a front surface side of the display panel 10, a mold frame 8 which contains the backlight 11, and a spacer 18 which holds the touch panel 12. The touch panel 12 is attached and fixed to the display panel 10 via an adhesive so as to overlap a front surface of the display panel 10. The spacer 18 is provided on a substrate 1 constituting the display panel 10, but is not attached and fixed to the substrate. The spacer 18 is attached and fixed to an end section of the touch panel 12 via an adhesive.

In the display device 20 illustrated in FIG. 9, the bezel illustrated in FIG. 8 is omitted. As such, an outer circumferential section of the touch panel 12 does not have a step. This makes it possible to obtain flatness of a display surface.

CITATION LIST

Patent Literatures

Patent Literature 1
Japanese Patent Application Publication, Tokukai, No. 2011-191608 A (Publication Date: Sep. 29, 2011)

SUMMARY OF INVENTION

Technical Problem

However, the display device 20 of Patent Literature 1 has an arrangement in which the touch panel 12 is attached and fixed only to the front surface of the display panel 10. This makes it difficult to carry out alignment between the touch panel 12 and the display panel 10 in a manufacturing process. This results in a problem that productivity is deteriorated because an operation of attaching the touch panel 12 to the display panel 10 takes time and effort. Further, variations may be caused between display devices as products.

The present invention is accomplished in view of the aforementioned problems. An object of the present invention is to provide a display device which includes a touch panel and enables to (i) maintain flatness of a display surface of the display device, (ii) increase productivity, and (iii) decrease variations caused during the manufacturing process.

Solution to Problem

In order to attain the object, a display device of the present invention including a touch panel is a display device, including: a display panel; a touch panel provided on an observer side of the display panel; and a single holding frame surrounding a side surface of each of the display panel and the touch panel, each of the display panel and the touch panel being held by the single holding frame.

The holding frame is constituted by a single component which surrounds the side surface of each of the display panel and the touch panel. This allows a front surface side (observer side) of the holding frame and a front surface side (observer side) of the touch panel to be aligned. Accordingly, it becomes possible to obtain flatness of a display surface of the display device.

Further, according to the arrangement above of the holding frame, the holding frame can serve as a jig when alignment between the display panel and the touch panel is carried out in a manufacturing process of the display device. This facilitates the alignment between the display panel and the touch panel, thereby allowing an increase in productivity of the display device and a reduction in variation caused during the manufacturing process.

Advantageous Effects of Invention

A display device of the present invention including a touch panel has an arrangement in which the display panel and the touch panel are held by a single holding frame which surrounds a side surface of each of the display panel and the touch panel. This makes it possible to provide a display device which includes a touch panel and which enables to (i) maintain flatness of a display surface, (ii) increase productivity, and (iii) reduce variations caused in the manufacturing process.

DESCRIPTION OF EMBODIMENTS

The following description will discuss an embodiment of a display device including a touch panel (hereinafter referred to as a display device) in accordance with the present invention.

Figure 1:
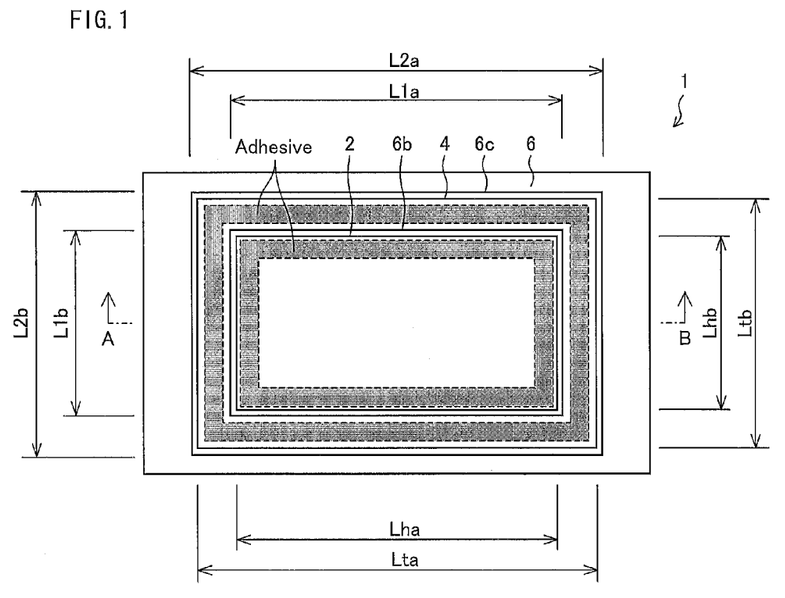
FIG. 1 is a plan view schematically illustrating an arrangement of a display device in accordance with an embodiment.
Figure 2:
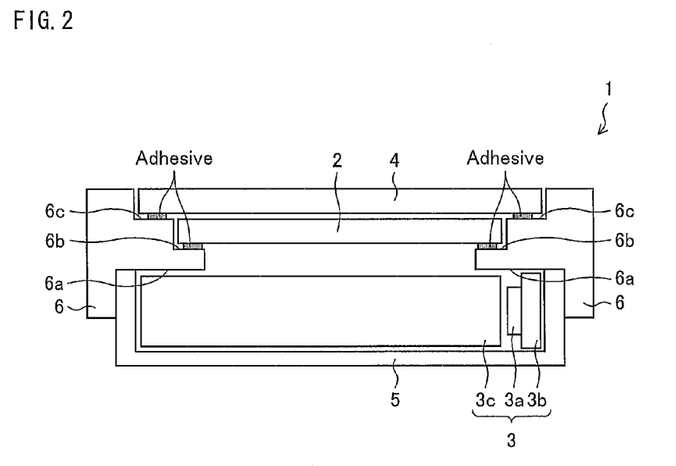
FIG. 2 is a cross-sectional view taken along a line A-B in FIG. 1.

FIG. 1 is a plan view schematically illustrating the display device in accordance with the present embodiment. FIG. 2 is a cross-sectional view taken along a line A-B in FIG. 1. A display device 1 includes a display panel 2, a backlight 3 provided on a back surface side of the display panel 2, a touch panel 4 provided on a front surface side of the display panel 2, a chassis 5 which contains the backlight 3, and a holding frame 6 which holds the display panel 2 and the touch panel 4.

The display panel 2 has a general image display function. For example, the display panel 2 can be a liquid crystal panel, an organic EL panel, a plasma display panel, or the like. The description below deals with an example case in which the display panel 2 is a liquid crystal panel. Note that since the display panel 2 has a well-known arrangement, detailed description of the display panel 2 and illustration of members constituting the display panel 2 will be omitted.

The display panel 2 is an active matrix type liquid crystal panel which includes (i) a pair of substrates (an active matrix substrate, a counter substrate (a color filter substrate)) facing each other and (ii) a liquid crystal layer provided between the pair of substrates. A counter substrate side of the display panel 2 serves as an observer side, and the backlight 3 is provided on a back surface side of the active matrix substrate.

The active matrix substrate is constituted by a glass substrate, on which various signal lines such as a scanning signal line and a data signal line, a transistor (TFT), a pixel electrode corresponding to each of pixels arranged in matrix, and various drive circuits (a gate driver, a source driver, and the like) are provided.

The counter substrate is constituted by a glass substrate, on which color filters of red, green, blue, and the like, a black matrix, and a common electrode (a counter electrode) are provided.

The display panel 2 which includes the arrangement above displays an image on the basis of an image signal inputted from an external signal source.

The backlight 3 is provided on the back surface side of the display panel 2, and emits light to the display panel 2. The backlight 3 includes an LED 3a as a light source, an LED substrate 3b for mounting the LED 3a thereon, and a light guide plate 3c for guiding, to the display panel 2, light emitted from the LED 3a. The backlight 3 is not limited to the arrangement above, but can employ a well-known arrangement.

The chassis 5 is formed in a rectangular box shape, and a surface of the chassis 5 which surface faces the display panel 2 has an opening. The chassis 5 contains the backlight 3 inside the opening.

The touch panel 4 is provided on the front surface side of the display panel 2. The touch panel 4 can employ, for example, various types of detection methods such as a capacitive sensing method, resistive film (pressure sensing) method. The description below deals with an example case in which the touch panel 4 uses the capacitive sensing method.

Figure 3:
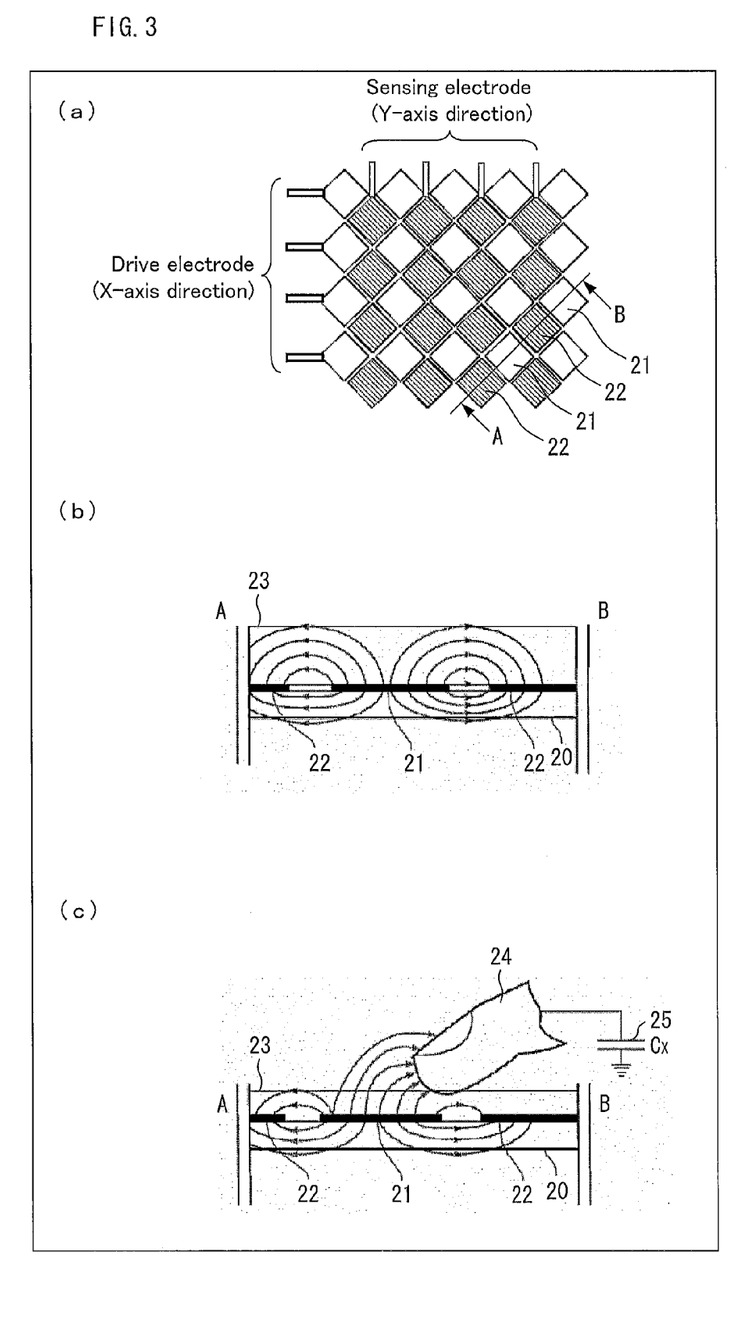
FIG. 3 shows views illustrating an example of a touch panel which uses a capacitive sensing method. (a) of FIG. 3 is a plan view illustrating an electrode arrangement of the touch panel. (b) of FIG. 3 is a cross-sectional view taken along a line A-B in (a) of FIG. 3. (c) of FIG. 3 is a is a view illustrating how the touch panel operates when a finger touches the touch panel.

FIG. 3 illustrates an example of the touch panel 4 which uses the capacitive sensing method. (a) of FIG. 3 is a plan view illustrating an electrode arrangement of the touch panel 4. (b) of FIG. 3 is a cross-sectional view taken along a line A-B in FIG. 3 (a). (c) of FIG. 3 is a view illustrating how the touch panel 4 operates when a finger (object to be detected) touches the touch panel 4.

As illustrated in (b) of FIG. 3, a plurality of drive electrodes 21 and a plurality of sensing electrodes 22 are provided on a substrate 20 which is constituted by a transparent insulator (dielectric). A cover glass 23 is provided so as to cover a surface on which the plurality of drive electrodes 21 and the plurality of sensing electrodes 22 are provided. The cover glass 23 is constituted by an insulator having a predetermined dielectric constant, for example, a transparent glass.

As shown in (a) of FIG. 3, the plurality of drive electrodes 21 are arranged such that drive electrodes 21 which belong to each row among the plurality of drive electrodes 21 are connected to each other in an x-axis direction, and the plurality of sensing electrodes 22 are arranged such that sensing electrodes 22 which belong to each row among the plurality of sensing electrodes 22 are connected to each other in a y-axis direction. As shown in (b) of FIG. 3, when a drive voltage is applied to the plurality of drive electrodes 21 and the plurality of sensing electrodes 22, a capacitance is formed between a drive electrode 21 and a sensing electrode 22 via the substrate 20 and the cover glass 23, so that lines of electric force are formed.

In this state, when a fingertip 24 touches a surface of the cover glass 23 as shown in (c) of FIG. 3, a capacitance 25 (Cx) is formed between the fingertip 24 and the ground via the human body, so that a part of the lines of electric force is grounded via the fingertip 24. This shows that a capacitance of a drive electrode 21 and a sensing electrode 22 which are located at a portion where the fingertip 24 touched has changed significantly. By detecting an amount of this change, a position touched by the fingertip 24 can be detected.

A position detection circuit for detecting a coordinate position of an object to be detected can be a well-known circuit, and is not particularly limited.

As shown in FIG. 2, the holding frame 6 covers an end section of the opening of the chassis 5 and holds the display panel 2 and the touch panel 4. The holding frame 6 has an external shape which is rectangular in a plan view as shown in FIG. 1. Further, as shown in FIG. 2, (i) a recessed section 6a for covering the end section of the opening of the chassis 5 and an upper section of a side surface of the chassis 5 is formed on a back surface side (backlight side) of the holding frame 6, (ii) a first step section 6b for holding the display panel 2 is formed on a front surface side (observer side) of the holding frame 6 inside the holding frame 6, and (iii) a second step section 6c for holding the touch panel 4 is formed on an outer side of the first step section 6b, the first step section 6b and the second step section 6c being in tiers. An opening for causing light emitted from the backlight 3 is formed on an inner side of the first step section 6b of the holding frame 6. That is, a size of the opening corresponds to a display area of the display panel 2. The end section of the opening of the chassis 5 and the upper section of the side surface of the chassis 5 are attached and fixed to an inside of the recessed section 6a.

Outer circumferential portions of respective four sides of the display panel 2 are attached and fixed, on the back surface side (backlight side) of the display panel 2, to the first step section 6b via an adhesive. As illustrated in FIG. 1, (i) a length L1a, along a lateral direction, of each of opposite side surfaces, extending in the lateral direction, of the first step section 6b of the holding frame 6 is set slightly longer than a length Lha of the display panel 2 along the lateral direction and (ii) a length L1b, along a longitudinal direction, of each of opposite side surfaces, extending in the longitudinal direction, of the first step section 6b of the holding frame 6 is set slightly longer than a length Lhb of the display panel 2 along the longitudinal direction. This allows a position of the display panel 2 in the longitudinal and lateral directions to be defined, and allows the display panel 2 to be held by the holding frame 6.

Outer circumferential portions of respective four sides of the touch panel 4 are attached and fixed, on the back surface side (backlight side) of the touch panel 4, to the second step section 6c via an adhesive. As illustrated in FIG. 1, (i) a length L2a, along the lateral direction, of each of opposite side surfaces, extending in the lateral direction, of the second step section 6c of the holding frame 6 is set slightly longer than a length Lta of the touch panel 4 along the lateral direction and (ii) a length L2b (not shown), along the longitudinal direction, of each of opposite side surfaces, extending in the longitudinal direction, of the second step section 6c of the holding frame 6 is set slightly longer than a length Ltb of the touch panel 4 along the longitudinal direction. This allows a position of the touch panel 4 in the longitudinal and lateral directions to be defined, and allows the touch panel 4 to be held by the holding frame 6.

The display panel 2 and the touch panel 4 can be attached and fixed to each other, or can be separated from each other instead of being attached and fixed to each other. A method of fixation is not limited to an adhesive, but can be a double-sided tape.

A height of the first step section 6b (a length of the first step section 6b along a thickness direction of the display panel 2) is set to a value which is equal to or greater than a value of a thickness of the display panel 2. The height of the first step section 6b is set in accordance with a distance between the display panel 2 and the touch panel 4. A height of the second step section 6c (a length of the second step section 6c along a thickness direction of the touch panel 4) is set to a value which is equal to a thickness of the touch panel 4. This makes it possible to obtain flatness of a display surface of the display device 1.

According to the arrangement of the holding frame 6, the display panel 2, the touch panel 4, and the backlight 3 can be integrated by use of a single member. Further, the holding frame 6 includes the first step part 6b and the second step part 6c, so that the holding frame 6 serves as a jig when alignment between the display panel 2 and the touch panel 4 is carried out in a manufacturing process of the display device 1. This facilitates the alignment between the display panel 2 and the touch panel 4, thereby allowing an increase in productivity of the display device 1 and a reduction in variation caused during the manufacturing process.

Modified Example 1

Figure 4:
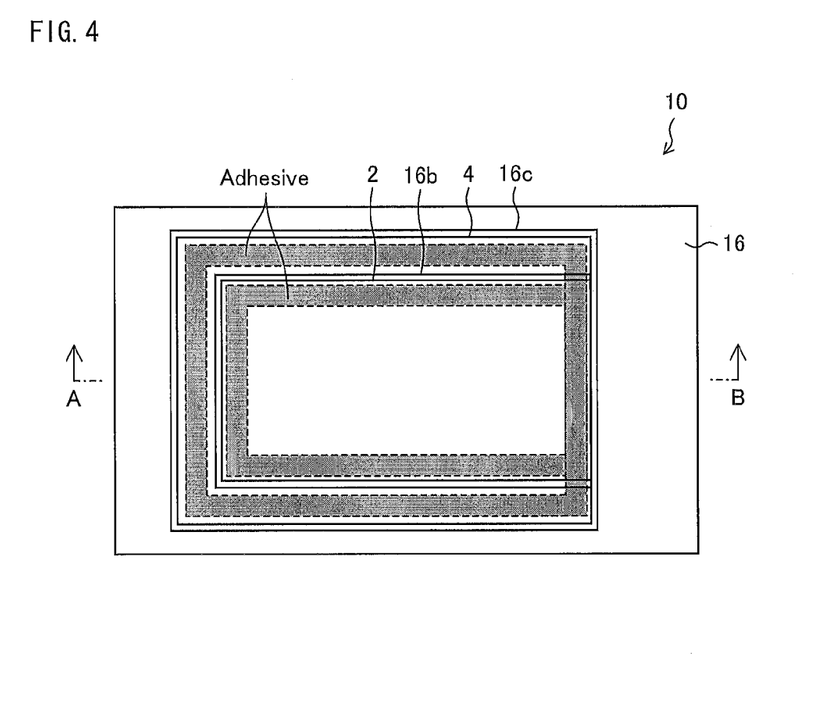
FIG. 4 is a plan view schematically illustrating an arrangement of a display device in accordance with Modified Example 1.
Figure 5:
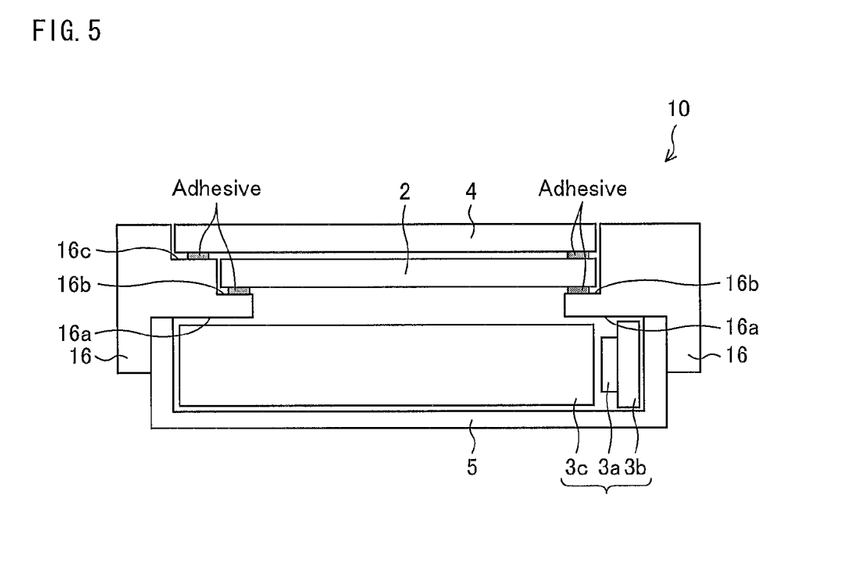
FIG. 5 is a cross-sectional view taken along a line A-B in FIG. 4.

FIG. 4 is a plan view schematically illustrating an arrangement of a display device in accordance with Modified Example 1. FIG. 5 is a cross-sectional view taken along a line A-B in FIG. 4. The holding frame 6 illustrated in FIGS. 1 and 2 includes the first step section 6b and the second step section 6c which are formed on four sides of the holding frame 6. Note, however, that the display device in accordance with the present invention is not limited to this.

In a display device 10 in accordance with Modified Example 1, a holding frame 16 includes (i) a recessed section 16a which is formed on four sides of the holding frame 16 on a back surface side thereof, (ii) a first step section 16b which is formed on four sides of the holding frame 16 on a front surface side thereof, and (iii) a second step section 16c which is formed on three sides of the holding frame 16 on the front surface side thereof.

A chassis 5 is arranged such that an end section of an opening of the chassis 5 and an upper section of a side surface of the chassis 5 are attached and fixed to an inside of the recessed section 16a. A display panel 2 is arranged such that outer circumferential sections of respective four sides of the display panel 2 on a back surface side of the display panel 2 are attached and fixed to the first step section 16b via an adhesive. A touch panel 4 is arranged such that outer circumferential sections of respective three sides of the touch panel 4 on a back surface side of the touch panel 4 are attached and fixed to the second step section 16c via an adhesive, and an outer circumferential section of one side of the touch panel 4 on the back surface side of the touch panel 4, on which one side the second step section 16c is not provided, is attached and fixed to the display panel 2 via an adhesive.

A height of the first step section 16b (a length of the first step section 16b along a thickness direction of the display panel 2) is set to a value which is equal to a value of a thickness of the display panel 2. A height of the second step section 16c (a length of the second step section 16c along a thickness direction of the touch panel 4) is set to a value which is equal to a thickness of the touch panel 4.

The arrangement of the display device 10 in accordance with Modified Example 1 also gives an effect similar to that provided by the display device 1 illustrated FIGS. 1 and 2.

In FIG. 4, the second step section 16c is formed on three sides. Note, however, that the second step section 16c can be formed on one side, or on two sides. In other words, the second step section 16c of the holding frame 16 is simply required to be formed so as to hold at least one of the four sides of the touch panel 4.

Modified Example 2

Figure 6:
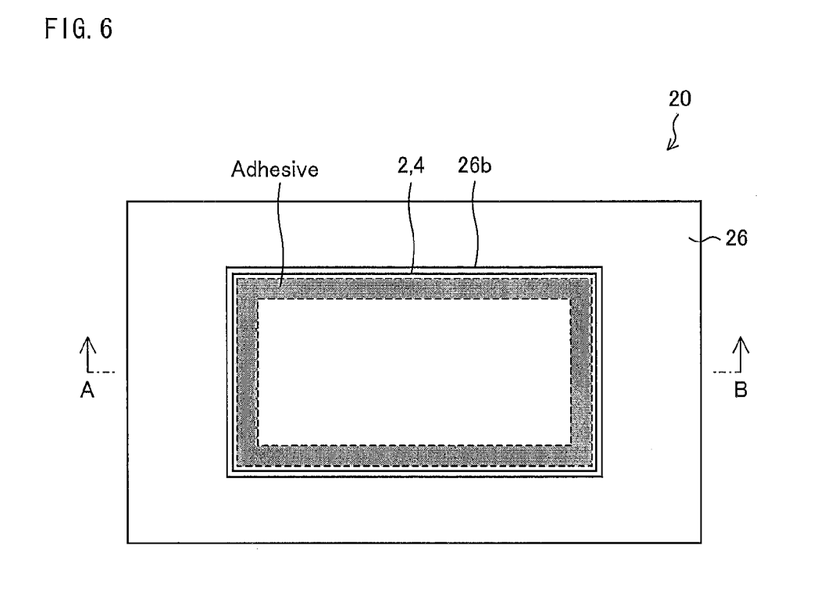
FIG. 6 is a plan view schematically illustrating an arrangement of a display device in accordance with Modified Example 2.
Figure 7:
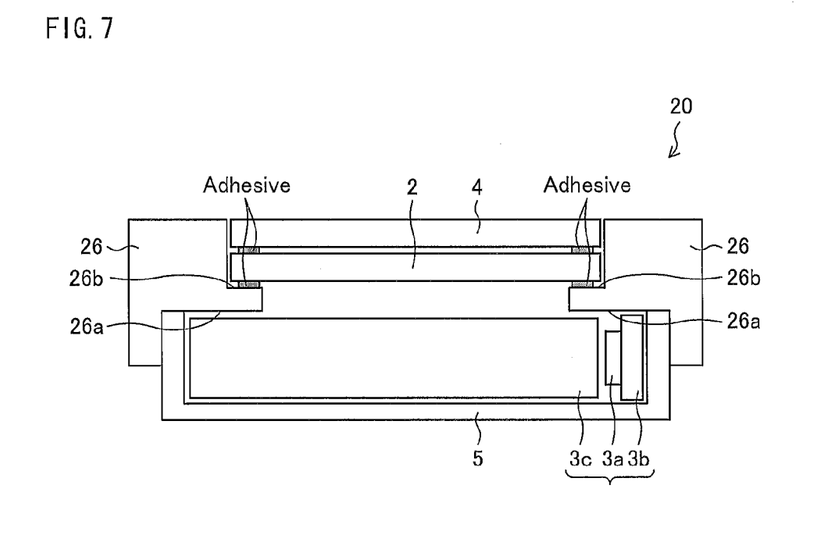
FIG. 7 is a cross-sectional view taken along a line A-B in FIG. 6.

FIG. 6 is a plan view schematically illustrating an arrangement of a display device in accordance with Modified Example 2. FIG. 7 is a cross-sectional view taken along a line A-B in FIG. 6. The holding frame 6 illustrated in FIGS. 1 and 2 includes the first step section 6b and the second step section 6c which are formed on the four sides of the holding frame 6. Note, however, that the display device in accordance with the present invention is not limited to this.

In a display device 20 in accordance with Modified Example 2, a holding frame 26 includes (i) a recessed section 26a which is formed on four sides of the holding frame 26 on a back surface side of thereof and (ii) a first step section 26b which is formed on four sides of the holding frame 26 on a front surface side thereof. In the holding frame 26, the second step section 6c illustrated in FIG. 2 and the second step section 16c illustrated in FIG. 5 are not provided.

A chassis 5 is arranged such that an end section of an opening of the chassis 5 and an upper section of a side surface of the chassis 5 are attached and fixed to an inside of the recessed section 26a. A display panel 2 is arranged such that outer circumferential sections of respective four sides of the display panel 2 are attached and fixed, on a back surface side of the display panel 2, to the first step section 26b via an adhesive. A touch panel 4 is arranged such that outer circumferential sections of respective four sides of the touch panel 4 are attached and fixed, on a back surface side of the touch panel 4, to the display panel 2 via an adhesive.

A height of the first step section 26b (a length of the first step section 26b along a thickness direction of the display panel 2) is set to a value which is equal to a sum of a thickness of the display panel 2 and a thickness of the touch panel 4.

The arrangement of the display device 20 in accordance with Modified Example 2 also gives an effect similar to that provided by each of the display devices 1 and 10 described above.

Summation of Embodiment

In order to attain the object, a display device of the present invention including a touch panel is a display device including: a display panel; a touch panel provided on an observer side of the display panel; and a single holding frame surrounding a side surface of each of the display panel and the touch panel, each of the display panel and the touch panel being held by the single holding frame.

The holding frame is constituted by a single component which surrounds the side surface of each of the display panel and the touch panel. This allows a front surface side (observer side) of the holding frame and a front surface side (observer side) of the touch panel to be aligned. Accordingly, it becomes possible to obtain flatness of a display surface of the display device.

Further, according to the arrangement above of the holding frame, the holding frame can serve as a jig when alignment between the display panel and the touch panel is carried out in a manufacturing process of the display device. This facilitates the alignment between the display panel and the touch panel, thereby allowing an increase in productivity of the display device and a reduction in variation caused during the manufacturing process.

The display device of the present invention including the touch panel can also be arranged such that the single holding frame includes a first step section for holding four sides of the display panel and a second step section for holding at least one side of the touch panel; and the first step section and the second step section are in tiers.

This further facilitates the alignment between the display panel and the touch panel.

The display device of the present invention including the touch panel can also be arranged such that an outer circumferential section of a surface of the display panel which surface is on a side opposite to an observer side is attached and fixed to the first step section; and at least a part of an outer circumferential section of a surface of the touch panel which surface is on a side opposite to an observer side is attached and fixed to the second step section.

This further facilitates the alignment between the display panel and the touch panel.

The display device of the present invention including the touch panel is preferably arranged such that a height of the first step section along a thickness direction of the display panel is more than a thickness of the display panel; and a height of the second step section along a thickness direction of the touch panel is identical to a thickness of the touch panel.

This makes it possible to reliably obtain flatness of a display surface of the display device.

The display device of the present invention including the touch panel is preferably arranged such that a height of the first step section along a thickness direction of the display panel is identical to a thickness of the display panel; a height of the second step section along a thickness direction of the touch panel is identical to a thickness of the touch panel; and at least a part of an outer circumferential section of a surface of the touch panel which surface is on a side opposite to an observer side is attached and fixed to the display panel.

The display device of the present invention including the touch panel is preferably arranged such that the display device further includes a backlight; and the single holding frame further including a recessed section for holding the backlight.

The display device of the present invention including the touch panel is preferably arranged such that the display device further includes a chassis which contains the backlight, the chassis being fixed inside the recessed section of the single holding frame.

The display device of the present invention including the touch panel is preferably arranged such that an opening for causing light emitted from the backlight to pass through is formed inside the recessed section of the single holding frame.

INDUSTRIAL APPLICABILITY

A display device of the present invention including a touch panel is readily applicable, for example, to a mobile terminal such as a mobile phone, a PDA (Personal Digital Assistants), or a notebook personal computer.

REFERENCE SIGNS LIST 1, 10, and 20: DISPLAY DEVICE
2: DISPLAY PANEL
3: BACKLIGHT
3a: LED (LIGHT SOURCE)
3b: LED SUBSTRATE
3c: LIGHT GUIDE PLATE
4: TOUCH PANEL
5: CHASSIS
6, 16, and 26: HOLDING FRAME
6a, 16a, and 26a: RECESSED SECTION
6b, 16b, and 26b: FIRST STEP SECTION
6c and 16c: SECOND STEP SECTION

The invention claimed is:
1. A display device comprising:
a display panel;
a touch panel provided on an observer side of the display panel; and
a single holding frame surrounding a side surface of each of the display panel and the touch panel, wherein
each of the display panel and the touch panel is held by the single holding frame;
the single holding frame includes a first step section holding four sides of the display panel and a second step section holding at least one side of the touch panel;
the first step section and the second step section are in tiers;
a height of the first step section along a thickness direction of the display panel is identical to a thickness of the display panel;
a height of the second step section along a thickness direction of the touch panel is identical to a thickness of the touch panel; and
at least a part of an outer circumferential section of a surface of the touch panel which surface is on a side opposite to an observer side is attached and fixed to the display panel.
2. The display device as set forth in claim 1, wherein:
an outer circumferential section of a surface of the display panel which surface is on a side opposite to an observer side is attached and fixed to the first step section; and at least a part of an outer circumferential section of a surface of the touch panel which surface is on a side opposite to an observer side is attached and fixed to the second step section.

3. A display device as set forth in claim 1, further comprising a backlight,
the single holding frame further including a recessed section for holding the backlight.

4. A display device as set forth in claim 3, further comprising a chassis which contains the backlight,
the chassis being fixed inside the recessed section of the single holding frame.

5. The display device as set forth in claim 3, wherein an opening for causing light emitted from the backlight to pass through is formed inside the recessed section of the single holding frame.

* * * * *